(No Model.)
A. A. ABBOTT.
TWO WHEELED VEHICLE.
No. 396,640. Patented Jan. 22, 1889.
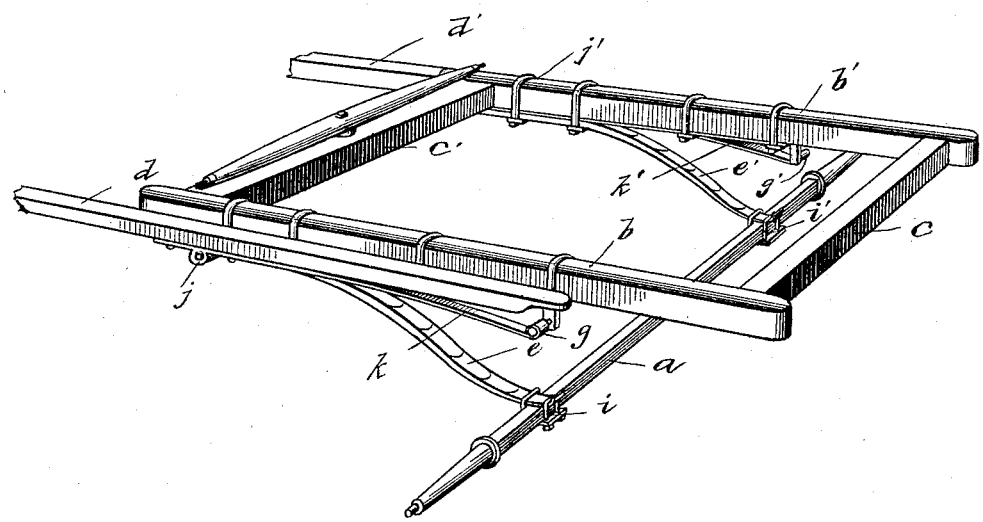

UNITED STATES PATENT OFFICE.

ARTHUR A. ABBOTT, OF CHICAGO, ILLINOIS.

TWO-WHEELED VEHICLE.

SPECIFICATION forming part of Letters Patent No. 396,640, dated January 22, 1889.

Application filed June 14, 1887. Serial No. 241,291. (No model.)

*To all whom it may concern:*

Be it known that I, ARTHUR A. ABBOTT, a citizen of the United States, residing at Chicago, in the county of Cook and State of Illinois, have invented a certain new and useful Improvement in Two-Wheeled Vehicles, which I desire to protect by Letters Patent of the United States, and of which the following is a specification.

My invention relates to improvements in two-wheeled vehicles in which provision is made to obviate the trasmission of an unpleasant jerking movement to the body of the vehicle produced by the motion of the horse, wherein I so embody this feature in a general construction and arrangement thereof, and the parts connected therewith, that in action, appearance, and in every way the result is greatly superior to preceding methods of construction, the result being accomplished by a particular location and arrangement of the bearings and controlling-springs of the vehicle to each other and their connecting parts.

My method embraces a pivoted connection of the shafts with the frame or running-gear of the vehicle, near the forward end of its body, in which the movement thus permitted is modified or neutralized by the action of springs in connection therewith, and is enforced and made certain by my mode of applying the principal springs upon which the body of the vehicle rides or is supported upon its axle.

In the accompanying drawing, forming a part of this specification, an illustration is given showing in perspective a view of those parts of the vehicle directly involved in my invention.

The axle $a$ is of usual construction. The frame, upon which the body of the vehicle may be supported in any convenient manner, is represented by the side bars, $b$ and $b'$, connected by the transverse bars $C$ and $C'$. The shafts are shown at $d$ and $d'$. The springs upon which the frame and upper structure are supported are shown at $e$ and $e'$. The latter are segments of elliptic springs, in which the leaf formation is shown. Springs $e$ and $e'$ are secured to the axle by means of clips, as shown at $i$ and $i$, or in any suitable manner that will secure them to the axle and retain them in position with relation thereto. The said springs, as obvious from the drawing, are respectively secured by means of clips to the under surface of the bars $b$ and $b'$. The curve of the springs elevates the frame sufficiently above the axle to admit of the necessary vertical play of the frame incident to the motions produced by travel. The shafts respectively have their pivoted connections with the frame at $j$ and $j'$, by means of bolts projecting from said frame, or in any convenient and suitable manner. Beneath each of the shafts, near their ends, are secured flat springs $k$ and $k'$, that bend downward in the direction of their outer ends, thus causing a separation at these points from the ends of the shafts. Springs $k$ and $k'$ are secured at their outer ends to the bars $b$ and $b'$, respectively, at $g$ and $g'$, by irons suitably extended downwardly and laterally, as obvious from the drawing. It is apparent that a pivotal action of the shafts at $j$ and $j'$ will be limited and controlled by the action of springs $k$ and $k'$.

I am aware that it is not new to pivotally connect the shafts to the running-gear of a two-wheeled vehicle and provide springs to control the movement. I am also aware that springs of the character shown in my invention and similarly applied are not new. In the first instance the body-supporting spring is located upon and in line with the axle. In the latter instance, where the spring, as shown, has been used, the shafts were rigidly connected with the frame. With this mode of construction, in which the springs coincide in direction with the shafts, and have their ends secured to the axle, a moderation of the objectionable jerking or oscillating movement imparted by the motion of the horse is obtained to a certain degree, even when the shafts are rigidly attached—that is, the seat for the accommodation of the occupant of the vehicle is above and the weight partially forward of the axle, and the latter is the focus or axis of vertical movement of the shafts. Thus the springs when attached, as with my invention, in which their length coincides with that of the shafts by yielding transversely, as they do, serve to diminish the movement otherwise imparted to the body of the vehicle. When the spring is located upon the axle, there can be no yielding thereof responsive to the vertical action of the shafts, and the movement of the body caused by such action is in an arc crossing a vertical plane with the axis of motion beneath. As a result of this a pivotal provision of the shafts when restrained by springs that properly control their action, only serves to partially prevent the aforesaid objectionable movement.

I find that by uniting the two methods of construction and practically supporting the body of the vehicle near the pivotal point a mutual respondence of spring action is obtained, yielding highly advantageous results.

While I have particularly described the construction of the springs, I do not design to limit myself in this matter, provided the form and mode of attachment are substantially the same.

Having thus described my invention, what I claim, and desire to secure by Letters Patent, is—

1. In a two-wheeled vehicle, the combination of shafts pivotally connected to the forward part of the body, springs for supporting said body connected at their rear ends to the axle, extended in line with the sides of the body and connected at their forward ends thereto, and springs connected at one end to the shafts, extended rearwardly in line therewith and connected at their rear ends to hangers depending from the body, substantially as described.

2. The combination of axle $a$, springs $e$ and $e'$, frame $b\ b'\ c\ c'$, pivoted shafts $d$ and $d'$, and springs $k$ and $k'$, substantially as described and shown.

ARTHUR A. ABBOTT.

Witnesses:
JOSEPH RIDGE,
FREDERICK C. GOODWIN.